United States Patent Office 3,696,065
Patented Oct. 3, 1972

3,696,065
REMOISTENING ADHESIVE COMPOSITIONS
Paul Hoffman, Gainesville, and Herbert W. Craig, Palatka, Fla., assignors to Hudson Pulp & Paper Corp., New York, N.Y.
No Drawing. Filed Mar. 30, 1970, Ser. No. 25,573
Int. Cl. C08f 15/00
U.S. Cl. 260—17.4 ST          3 Claims

ABSTRACT OF THE DISCLOSURE

Remoistening adhesive compositions having improved quick tack and comprising a starch substantially free of amylose and at least 0.25 percent by weight of a copolymer of vinyl pyrrolidone and vinyl acetate.

---

The present invention relates to remoistening adhesive compositions especially suitable for the manufacture of gummed tape and other adhesive-coated substrates the adhesive of which is remoistened prior to use, and to adhesive sheets coated with such a remoistening adhesive composition.

More in particular, the invention relates to improved remoistening adhesives having increased quick tack. Quick tack is an important property of remoistening adhesive, particularly for adhesives coated on substrates such as a web of tough kraft paper to make a gummed tape. It is important that such tapes, when moistened and applied to articles such as cardboard cartons and the like, adhere to them quickly and with sufficient strength to hold the article in a desired configuration, e.g. with flaps folded. Reducing the time the tape has to be held to the article, by a person or by a machine, before the tape adheres sufficiently is a very important economic consideration, since it can affect the speed, size, and design of machines and of entire production lines. Thus, the initial stickiness, or quick tack of an adhesive is the principal factor in the selection of adhesives for making gummed tapes and the like, as well as in the selection of such products for particular applications.

U.S. Pats. No. 2,791,512 and No. 2,997,404 describe remoistening adhesives having highly desirable properties for making gummed tape and the like. These patents each teach remoistening adhesive compositions principally comprising starch substantially free of amylose.

It has been found that the quick tack of remoistening adhesive compositions like those in the prior art discussed above based principally on starch substantially free of amylose and high in amylopectin can be increased by the addition of very small amounts of a solid copolymer of vinyl pyrrolidone and vinyl acetate. As little as about 0.25 percent by weight of the copolymer added to a substantially amylose-free starch adhesive composition substantially improves the quick tack of the composition. The quick tack continues to increase with larger amounts of copolymer additive, although at a decreasing rate for amounts greater than about 4 percent by weight of the composition. The preferred amount of copolymer additive is between about 0.25 and about 4 percent by weight of the composition, in which range the quick tack of a substantially amylose-free starch adhesive can be increased substantially. Amounts of additive greater than 4 percent do not significantly increase the quick tack of the compositions when weighed against the cost of the additional additive.

Starches substantially free of amylose and high in amylopectin of a type suitable for use in the present invention are well-known in the art and are commercially available under a variety of trade names including "Tapon," a starch substantially free of amylose sold by The National Starch Company, "Starch 839," "Gum-Tac," etc.

The vinyl pyrrolidone/vinyl acetate copolymers suitably contain from 30 to 60 percent by weight of vinyl pyrrolidone and from 70 to 40 percent by weight of vinyl acetate. The solid resins can be prepared by emulsion polymerization in the presence of a free-radical initiator as described in U.S. 3,166,525, or by solvent polymerization as described in U.S. 3,171,784, for example. Such resins are commercially available, for example under the trade name "Gantron."

The improved quick tack characteristic of the remoistening adhesives of the present invention is exhibited by adhesive compositions containing only starch substantially free of amylose in combination with the copolymer additive. However, in practice other materials are usually added to such a two-component system to contribute desirable properties other than quick tack, or to reduce cost.

Thus, certain preferred compositions according to the invention include anti-curling agents, known per se and commonly employed in the adhesive art, such as sodium nitrate, urea, and the like. The inclusion of such agents does not materially affect the surprising increase in the quick tack characteristic of adhesives combining amylose-free starch and the copolymer additive. Such anti-curling agents can be incorporated in amounts of up to about 15 percent by weight, suitably in amounts from about 5 percent to 15 percent by weight.

To reduce costs and also to reduce the viscosity of the coating mixture, dextrin may be added to the adhesive in amounts up to about 15 percent by weight, suitably from about 5 percent to 15 percent by weight, as a substitute for the commercially available but relatively more expensive amylose-free starches. Use of the dextrin diluent causes relatively small loss of the improved quick tack found in adhesive compositions combining amylose-free starch and a vinyl pyrrolidone/vinyl acetate copolymer.

A better understanding of the present invention and of its many advantages will be had by referring to the following specific examples given by way of illustration.

In the following examples, a modified McLaurin tack tester was employed to measure the tack values. In particular, the McLaurin tack tester was used in accordance with the Standard Method of Test for Adhesiveness of Gummed Tape, ASTM designation: D 773–47, but was modified to permit measurement of the high tack values exhibited by the tapes tested. Thus, whereas the Standard Test fixes the height of a brush moistening the tape to be tested at 1.7 in. (43 mm.) above the surface of the water used for moistening, this brush setting delivers an amount of moisture which, if used with the highly tacky adhesives of the present invention, results in high tack values outside the range indicated in the Standard Test as within preferred limits of accuracy for the standard tack testing apparatus.

Accordingly, in performing the test reported in the following examples, the height of the brush above the water level was decreased to increase the amount of moisture supplied to the tapes being tested. The increased moisture present on the tapes decreased their tack to give tack values within the limits of accuracy of the modified tester.

For calibration, the brush height was chosen such that a "standard" gummed paper tape having a tack value of 75 on the unmodified tester showed a tack value of 40 when tested on the modified device. To permit a comparison with tapes measured by the Standard Test, all the tack readings subsequently taken on the modified device and reported in the examples below have been restated as tack values in terms of the unmodified device by use of the calibration factor 75/40.

EXAMPLE 1

3-inch paper tape was coated in an experimental gum coater with a 1-quart batch of adhesive prepared by combining 99.75 percent by weight of amylose-free starch commercially available under the trade name "Tapon" with 0.25 percent by weight of a copolymer comprising 60 percent by weight of vinyl acetate and 40 percent by weight of vinyl pyrrolidone commercially available under the trade name "Gantron S–860." This resin has a viscosity number of 1.05 measured in a 0.1 percent solution in ethylene glycol monoethyl ether at 23° C., a melting point range of 133°–135° C. measured on a Mannheim block, and a decomposition point of about 195° C. The resin is soluble in water and in organic solvents such as toluene. The glue coat weight was 15.3 lbs./ream. The tack value measured on a modified McLaurin tack tester was 84. Paper tape coated with the starch alone at a comparable glue coat weight has a tack of 65.

EXAMPLE 2

Proceeding as in Example 1, a 3-inch paper tape was coated at a glue coat weight of 14.9 lbs./ream with a composition comprising 98.0 percent by weight of "Tapon" amylose-free starch and 4.0 percent by weight of "Gantron S–860" copolymer resin. The tape had a tack value of 119.

EXAMPLE 3

Gummed paper tapes were made on conventional production machinery with adhesive formulations containing from 81 to 85 percent by weight of "Tapon," a starch substantially free of amylose, 7.5 percent by weight of sodium nitrite as an anti-curling agent, 7.5 percent by weight of dextrin as a diluent, and from 0 to 4 percent by weight of "Gantron S–860," a copolymer of vinyl pyrrolidone and vinyl acetate. The tapes were coated at a glue coat weight of 15 lbs./ream. The tack values of the papers were measured on a modified McLaurin tack tester as a function of the percent of copolymer additive. The results are given in Table I below.

TABLE I

| Percent by weight of additive: | Tack |
|---|---|
| 0 | 75 |
| 0.5 | 93 |
| 1.0 | 112 |
| 2.0 | 130 |
| 4.0 | 140 |

What is claimed is:

1. A remoistening adhesive composition comprising up to 15 percent by weight of dextrin, up to 15 percent by weight of an anti-curling agent, and 0.25 to 4 percent by weight of a solid copolymer containing from 30 to 60 percent by weight of vinyl pyrrolidone and from 70 to 40 percent by weight of vinyl acetate, the balance of said adhesive composition being a starch substantially free of amylose.

2. An adhesive sheet comprising a flexible paper backing coated on one side with a remoistening adhesive composition as defined in claim 1.

3. An adhesive sheet as in claim 2 wherein said flexible paper backing is an elongated paper strip.

References Cited

UNITED STATES PATENTS

| | | | |
|---|---|---|---|
| 2,791,512 | 5/1957 | Hatch et al. | 106—208 |
| 2,917,296 | 12/1959 | Agulnick | 106—128 |
| 2,978,343 | 4/1961 | Russo et al. | 106—128 |
| 2,997,404 | 8/1961 | Roberson et al. | 106—205 |
| 3,166,525 | 1/1965 | Perry | 260—29.6 |

WILLIAM H. SHORT, Primary Examiner

L. L. LEE, Assistant Examiner

U.S. Cl. X.R.

117—122 PA, 156, 165; 260—85.7